(12) United States Patent
Tan

(10) Patent No.: US 12,445,071 B2
(45) Date of Patent: Oct. 14, 2025

(54) DRIVING CIRCUIT, SYSTEM AND METHOD FOR RESONANT DEVICE

(71) Applicant: Realtek Semiconductor Corp., HsinChu (TW)

(72) Inventor: Jen-Chieh Tan, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 212 days.

(21) Appl. No.: 18/533,242

(22) Filed: Dec. 8, 2023

(65) Prior Publication Data

US 2024/0235439 A1     Jul. 11, 2024

(30) Foreign Application Priority Data

Jan. 5, 2023   (TW) .................................. 112100405

(51) Int. Cl.
    *H02K 33/04*     (2006.01)
    *G06F 3/01*     (2006.01)
    *H02P 6/15*     (2016.01)
    *H02P 6/182*     (2016.01)

(52) U.S. Cl.
    CPC .............. *H02P 6/182* (2013.01); *G06F 3/016* (2013.01); *H02P 6/157* (2016.02)

(58) Field of Classification Search
    CPC .......... H02P 6/182; H02P 6/157; H02P 6/006; H02P 25/032; H02P 25/06
    See application file for complete search history.

(56) References Cited

U.S. PATENT DOCUMENTS

| | | | |
|---|---|---|---|
| 7,843,277 B2 | 11/2010 | Gregorio | |
| 9,054,627 B2 | 6/2015 | Garg | |
| 10,958,203 B2 | 3/2021 | Meng | |
| 2018/0183372 A1* | 6/2018 | Li | ........................... G06F 3/016 |

FOREIGN PATENT DOCUMENTS

TW               202010239 A      3/2020

* cited by examiner

*Primary Examiner* — Muhammad S Islam
(74) *Attorney, Agent, or Firm* — Winston Hsu

(57) ABSTRACT

A driving circuit for driving a resonant device includes a voltage sensor, a signal controller, a signal generator and a driver. The voltage sensor, coupled to the resonant device, is configured to detect a back electromotive force (EMF) of the resonant device. The signal controller, coupled to the voltage sensor, is configured to control the length of an operation period of the driving circuit according to the back EMF. The signal generator, coupled to the signal controller, is configured to generate a driving signal corresponding to the length of the operation period. The driver, coupled to the signal generator, is configured to output the driving signal to the resonant device.

20 Claims, 4 Drawing Sheets

DRIVING CIRCUIT, SYSTEM AND METHOD FOR RESONANT DEVICE

BACKGROUND OF THE INVENTION

1. Field of the Invention

The present invention relates to a driving circuit, and more particularly, to a driving circuit for driving a resonant device.

2. Description of the Prior Art

In recent years, haptic feedback technology has been widely used in various applications such as virtual reality (VR), game consoles, mobile phones, wearable devices and touch panels, and it can apply haptic vibration feedback in the human-machine interface to provide users with a more realistic tactile experience. Linear resonant actuator (LRA) is a device commonly used in tactile feedback control. The LRA has a good vibration effect and possesses the advantages of thinness, power saving, and fast response, so it has become the mainstream of tactile feedback devices.

According to the mechanical characteristics of the LRA, the optimal driving efficiency may be achieved when it operates at its own resonant frequency. At this moment, the driving circuit may make the LRA reach the maximum vibration degree under the minimum energy output. Conventionally, the resonant frequency of the LRA may be determined by monitoring the time when a feedback signal crosses zero. However, this method has certain requirements on the clock frequency and the feedback signal quality. If the clock frequency is too low, the error of timing calculation may be too large, resulting in wrong determination of the resonant frequency. If the noise of the feedback signal is too large, there may be a wrong zero-crossing point, resulting in wrong determination of the resonant frequency. Thus, there is a need for improvement over the prior art.

SUMMARY OF THE INVENTION

It is therefore an objective of the present invention to provide a novel driving circuit for driving a linear resonant actuator (LRA) or similar resonant device to operate at its resonant frequency, in order to solve the abovementioned problems.

An embodiment of the present invention discloses a driving circuit for driving a resonant device. The driving circuit comprises a voltage sensor, a signal controller, a signal generator and a driver. The voltage sensor, coupled to the resonant device, is configured to detect a back electromotive force (EMF) of the resonant device. The signal controller, coupled to the voltage sensor, is configured to control the length of an operation period of the driving circuit according to the back EMF. The signal generator, coupled to the signal controller, is configured to generate a driving signal corresponding to the length of the operation period. The driver, coupled to the signal generator, is configured to output the driving signal to the resonant device.

Another embodiment of the present invention discloses a driving system, which comprises a resonant device and a driving circuit. The driving circuit is configured to drive the resonant device and comprises a voltage sensor, a signal controller, a signal generator and a driver. The voltage sensor, coupled to the resonant device, is configured to detect a back EMF of the resonant device. The signal controller, coupled to the voltage sensor, is configured to control the length of an operation period of the driving circuit according to the back EMF. The signal generator, coupled to the signal controller, is configured to generate a driving signal corresponding to the length of the operation period. The driver, coupled to the signal generator, is configured to output the driving signal to the resonant device.

Another embodiment of the present invention discloses a driving method for a driving circuit to drive a resonant device. The driving method comprises steps of: detecting a back EMF of the resonant device; controlling the length of an operation period of the driving circuit according to the back EMF; generating a driving signal corresponding to the length of the operation period; and outputting the driving signal to the resonant device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
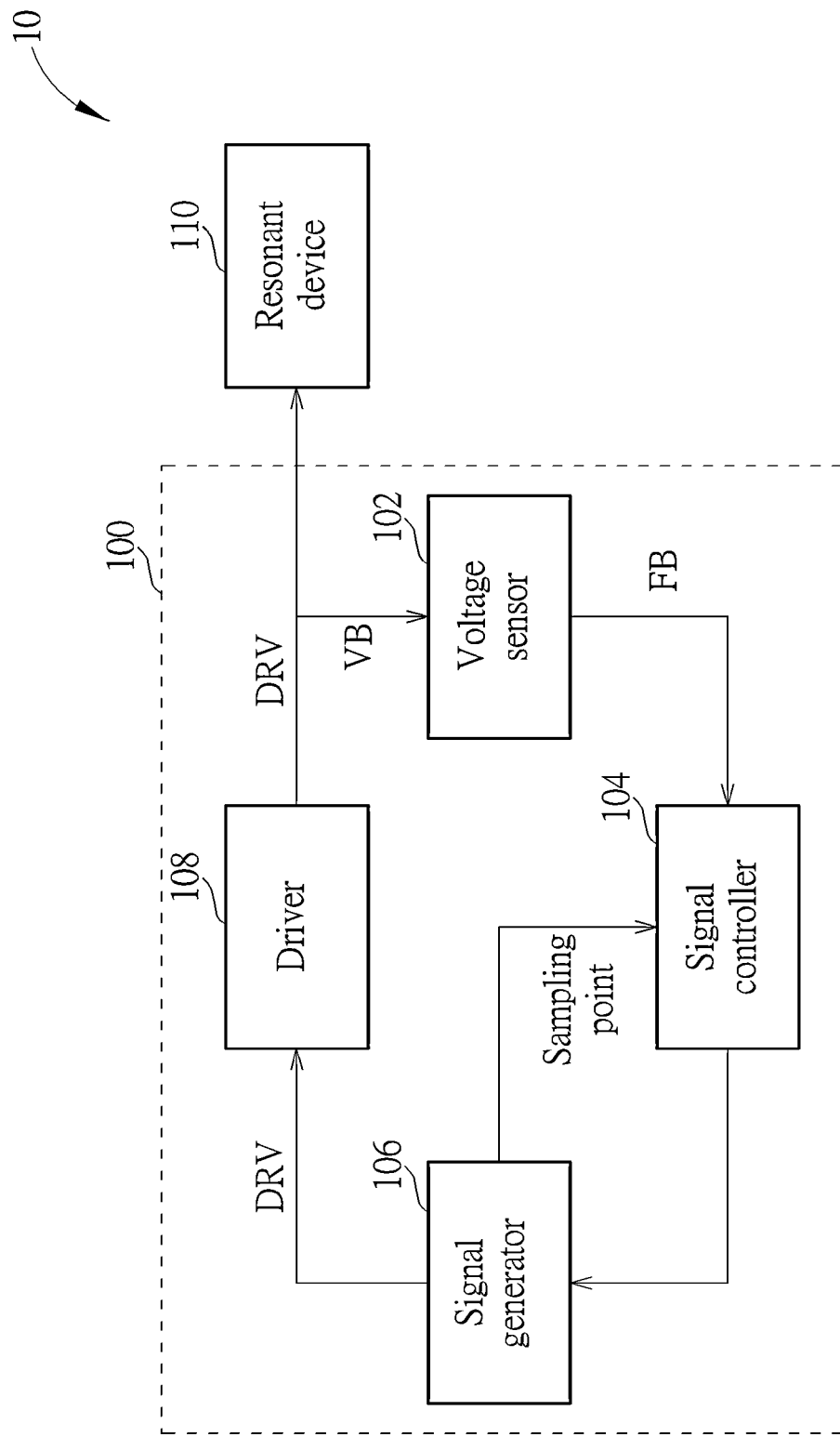
FIG. 1 is a schematic diagram of a driving system according to an embodiment of the present invention.

FIG. 1 is a schematic diagram of a driving system 10 according to an embodiment of the present invention. The driving system 10 includes a driving circuit 100 and a resonant device 110. The resonant device 110 may be a mechanical device having resonant characteristics, such as a linear resonant actuator (LRA), but not limited thereto. The driving circuit 100 may be configured to drive the resonant device 110 to resonate. In an embodiment, the driving circuit 100 may be an integrated circuit (IC) implemented in a chip.

In detail, the driving circuit 100 includes a voltage sensor 102, a signal controller 104, a signal generator 106 and a driver 108. The voltage sensor 102 is coupled to the resonant device 110 and configured to detect a back electromotive force (back EMF) VB of the resonant device 110. The back EMF VB, which is a sensing electromotive force generated during the resonance of the resonant device 110, is in the form of voltage and may be detected by the voltage sensor 102.

The signal controller 104 may control the length of an operation period of the driving circuit 100 according to the detected back EMF VB. For example, the signal generator 106 may control the signal controller 104 to detect the back EMF VB once in every half cycle of the driving signal; hence, each operation period may be one half cycle of the driving signal. In an embodiment, the signal controller 104 may be a frequency controller or a cycle controller for controlling the driving frequency or driving cycle of the driving circuit 100, to determine the length of the operation period according to the driving frequency or driving cycle. Examples of the signal controller 104 include, but not limited to, a proportional integral controller (PI controller).

The signal generator 106 is configured to generate a driving signal DRV corresponding to the length of the operation period. For example, a longer pulse of the driving signal may be generated under a longer operation period, and a shorter pulse of the driving signal may be generated under a shorter operation period. In an embodiment, the signal generator 106 may generate a periodical driving signal DRV, and determine the frequency and cycle of the driving signal DRV according to the frequency or cycle information received from the signal controller 104. The driving signal DRV generated by the signal generator 106 may be in any waveform, such as the square wave, sinusoidal wave, or triangle wave, but not limited thereto. As long as the driving signal DRV generated by the signal generator 106 may be used for driving the operations of the resonant device 110, the related driving waveforms should belong to the scope of the present invention. In an embodiment, the signal generator 106 may include a pulse width modulation (PWM) generator, which is configured to generate the driving signal DRV having a specific pulse width.

The driver 108 may be configured to output the driving signal DRV to the resonant device 110. In general, the driver 108 may include one or more output circuits having sufficient driving capabilities, to drive the loads on the resonant device 110. A switch may be deployed cooperatively to control the output timing of the driving signal DRV.

Figure 2A:
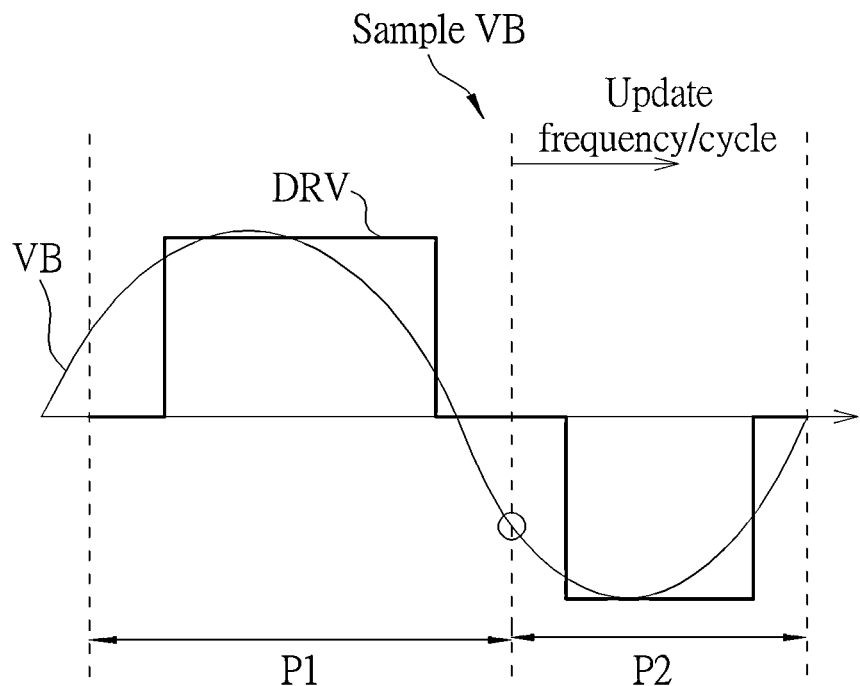
FIG. 2A, FIG. 2B, FIG. 3A and FIG. 3B are waveform diagrams of the signals of the resonant device according to an embodiment of the present invention.
Figure 2B:
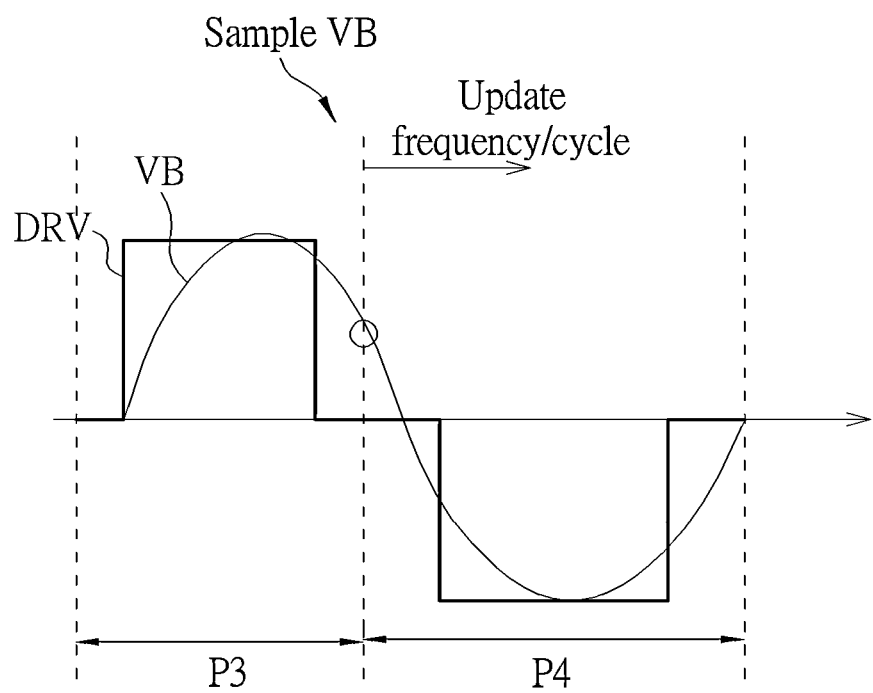

FIGS. 2A and 2B are waveform diagrams of the signals of the resonant device 110 according to an embodiment of the present invention, where the waveforms of the driving signal DRV and the back EMF VB in two consecutive operation periods are illustrated. As shown in FIG. 2A, the voltage sensor 102 may sample the back EMF VB at the end of the operation period P1. The signal controller 104 updates the driving frequency/cycle according to the magnitude of the obtained back EMF VB, to modify the length of the next operation period P2. In this embodiment, the voltage sensor 102 detects that the back EMF VB at the end of the operation period P1 is smaller than 0, and the signal controller 104 determines that the driving frequency is too low or the driving cycle is too long accordingly, so as to shorten the next operation period P2, making the length of the operation period P2 shorter than the length of the operation period P1. Since the signal frequency of the back EMF VB corresponds to the resonant frequency of the resonant device 110, the above adjustment makes the driving frequency of the driving circuit 100 approach the resonant frequency of the resonant device 110.

FIG. 2B illustrates another situation where the voltage sensor 102 detects that the back EMF VB is greater than 0 at the end of the operation period P3. Therefore, the signal controller 104 determines that the driving frequency is too high or the driving cycle is too short, so as to lengthen the next operation period P4, making the length of the operation period P4 longer than the length of the operation period P3.

Referring back to FIG. 1, in addition to generating the corresponding driving signal DRV according to the frequency/cycle information received from the signal controller 104, the signal generator 106 may also control the time point of sampling the back EMF VB (i.e., the feedback signal FB) of the signal controller 104, to obtain an accurate value of the back EMF VB. As shown in FIG. 1, the feedback signal FB may be the back EMF VB on the sampling point. After determining the sampling point, the signal generator 106 sends the related information to the signal controller 104, to control the signal controller 104 to perform sampling at the sampling point, so as to obtain the feedback signal FB.

By the above method, the driving circuit 100 may detect the back EMF VB in every half cycle (i.e., each operation period), and adjust the length of the next operation period according to the detected value of the back EMF VB, allowing the frequency of the driving signal DRV to approach the resonant frequency of the resonant device 110. When the back EMF VB equal to 0 is detected at the end of an operation period, the frequency of the driving signal DRV at that moment is equal to the resonant frequency of the resonant device 110.

Note that the detecting method for the back EMF VB as shown in FIGS. 2A and 2B take the positive half cycle as an example; that is, the back EMF VB is detected at the end of a half cycle where the driving signal is a positive signal. In another embodiment, the value of the back EMF VB may also be detected at the end of a negative half cycle where the driving signal is a negative signal, and the driving frequency/cycle and the operation period may be adjusted accordingly, as shown in FIGS. 3A and 3B.

Figure 3A:
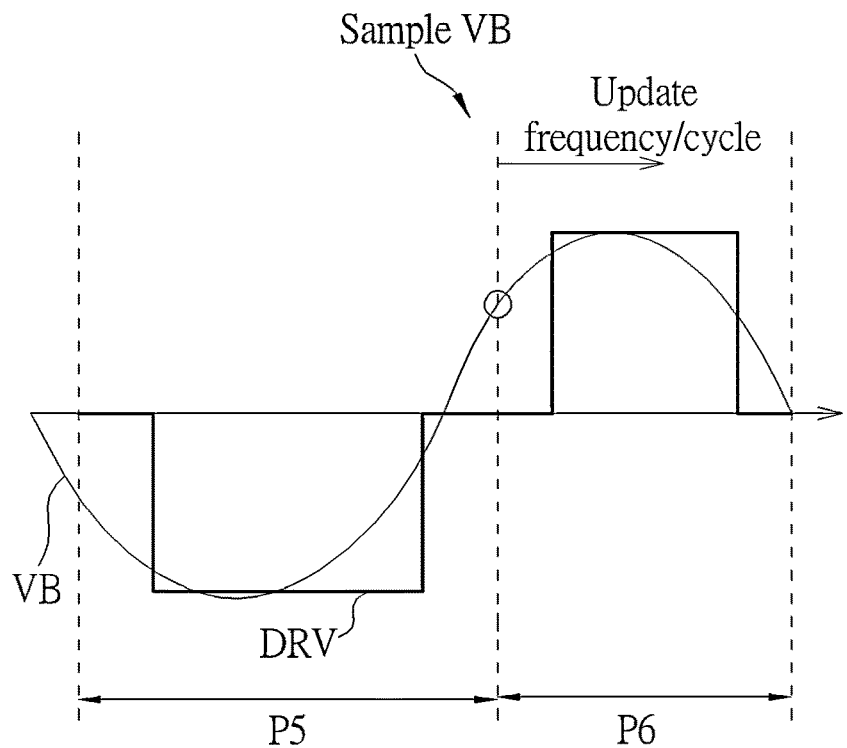
Figure 3B:
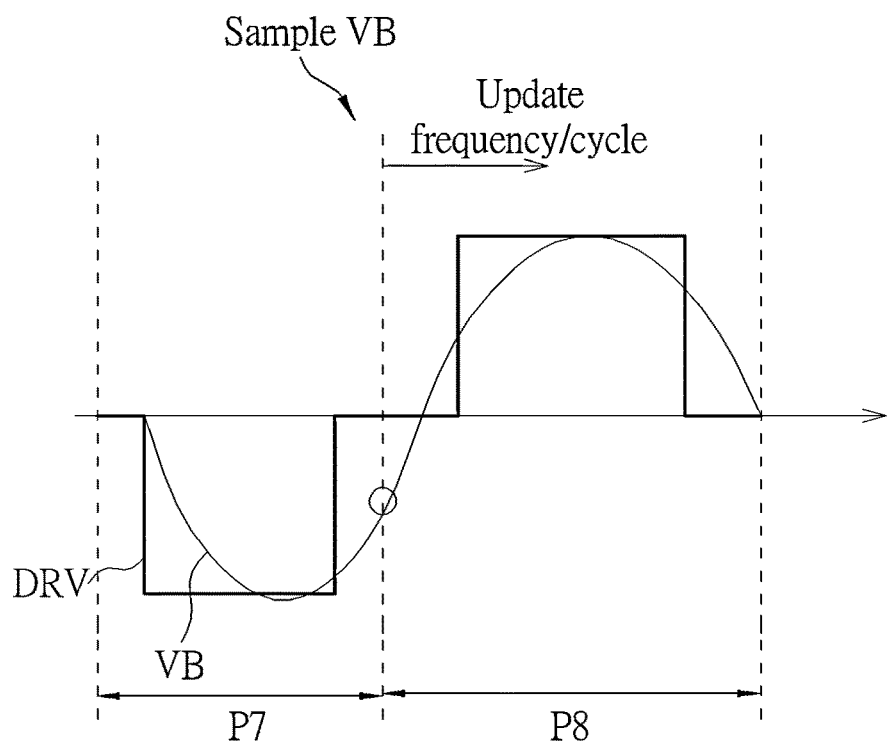

In detail, in FIG. 3A, the voltage sensor 102 detects that the back EMF VB is greater than 0 at the end of the operation period P5, and thus the signal controller 104 determines that the driving frequency is too low or the driving cycle is too long, so as to shorten the next operation period P6, making the length of the next operation period P6 shorter than the length of the operation period P5. In FIG. 3B, the voltage sensor 102 detects that the back EMF VB is smaller than 0 at the end of the operation period P7, and thus the signal controller 104 determines that the driving frequency is too high or the driving cycle is too short, so as to lengthen the next operation period P8, making the length of the operation period P8 longer than the length of the operation period P7.

As can be seen, no matter in the positive half cycle or the negative half cycle, the driving circuit 100 may continuously detect the back EMF VB and adjust the driving frequency accordingly, to gradually approach the resonant frequency of the resonant device 110 after multiple cycles. Since the back EMF VB resonates inversely in the positive half cycle and in the negative half cycle, the adjustment directions for adjusting the operation period length according to the back EMF VB are opposite. But the purpose is to control the driving frequency (i.e., the frequency of the driving signal DRV) of the driving circuit 100 to approach the resonant frequency of the resonant device 110.

Note that the voltage sensor 102 is coupled to the driving terminal of the resonant device 110 (i.e., a terminal on which the resonant device 110 receives the driving signal DRV), to detect the back EMF VB from the resonant device 110. During the process where the driver 108 outputs the driving signal DRV, the signal detected by the voltage sensor 102 is the combination of the back EMF VB, the driving signal DRV, and multiple signals such as a voltage drop generated from internal resistors/inductors of the resonant device 110. The detected signal has a quite complex waveform and is hard to interpret the pure back EMF VB. Therefore, the present invention may output the driving signal DRV by using a high-impedance (Hi-Z) driving method, so that the voltage sensor 102 is able to obtain the pure back EMF VB without any other signal components.

In an embodiment, each operation period may include a driving period and a Hi-Z period, where the driving period is a time period in which the driver 108 outputs the pulse of the driving signal DRV, and the Hi-Z period is a time period in which the driver 108 stops outputting the pulse. As shown in FIGS. 2A, 2B, 3A and 3B, each operation period has a pulse of the driving signal DRV, and the periods before and after the pulse are Hi-Z periods. In the Hi-Z periods, the voltage of the driving signal DRV is 0, or it may be considered that the output of the driving signal DRV is stopped.

In an embodiment, a switch inside the driver 108 may be open, or the connection wire between the driver 108 and the resonant device 110 may be cut off, allowing the output terminal of the driver 108 to be in a Hi-Z state, so as to realize the operations of the Hi-Z period. At this moment, the signal generator 106 may output a control signal to control the driver 108 to realize the high impedance. In another embodiment, the Hi-Z state may be realized by stopping or isolating the output of the signal generator 106. In the Hi-Z period, the signal from the resonant device 110 to be detected by the voltage sensor 102 only includes the back EMF VB but does not include the driving signal DRV and other unnecessary signals, and the value of the back EMF VB may be accurately obtained.

In an embodiment, the length of a Hi-Z period before the driving period may be designed to be substantially equal to the length of a Hi-Z period after the driving period in each operation period. That is, in an operation period, given a first Hi-Z period before the driving period and a second Hi-Z period after the driving period, the signal generator 106 and the driver 108 may control the length of the first Hi-Z period to be substantially equal to the length of the second Hi-Z period.

In the present invention, the length of each operation period may be adjusted according to the back EMF VB detected in the previous operation period. With the variations of the operation period length, the timing allocations of the driving period and Hi-Z period may also be adjusted accordingly. In an embodiment, a pulse of the driving signal may be designed to be equal to a specific ratio of the operation period length, so that the length of the driving period and the length of the Hi-Z period have a fixed ratio, and these lengths may be simultaneously adjusted in response to the length of the operation period. Alternatively, the Hi-Z period may be designed to have a fixed length, and in such a situation, only the pulse of the driving signal is adjusted based on the variations of the operation period length. In addition, the Hi-Z period lengths at the front and back of an operation period (i.e., before and after the corresponding driving pulse) may be the same or different from each other, depending on system requirements.

As mentioned above, in the prior art, the resonant frequency is determined based on the zero-crossing time point of the feedback signal, where the zero-crossing time point is usually interpreted by using a counter, and thus a higher clock frequency or sampling rate is necessary to perform detection, in order to avoid an excessively large error of the detected resonant frequency. In addition, the detection of zero-crossing time point requires a great number of samples to obtain the detection result. In contrast, the present invention performs sampling on a known time point (i.e., the end time point of an operation period), and only a few samples and a lower sampling rate are able to obtain an accurate value of the back EMF. Further, the method of detecting the back EMF in the present invention may still finely tune the length or frequency/cycle of the operation period when the value of the back EMF is quite small; hence, the back EMF may be much closer to 0 at the end of the operation period, to obtain a more accurate resonant frequency.

Please note that the present invention aims at providing a driving circuit and related driving method for driving a resonant device, to adjust the driving frequency to approach the resonant frequency by detecting the back EMF. Those skilled in the art may make modifications and alterations accordingly. For example, the structure of the driving circuit 100 shown in FIG. 1 is merely an exemplary implementation of the present invention. In another embodiment, the signal controller 104 and the signal generator 106 may be integrated into the same circuit block or module, to perform the adjustment and generation of the driving signal by using the same circuit. Alternatively or additionally, the signal generator 106 and the driver 108 may be integrated into the same circuit block or module, to perform the generation and output of the driving signal by using the same circuit. In addition, the method of adjusting the driving frequency/cycle according to the back EMF VB may be performed in any appropriate manner. For example, the adjustment degree may be determined according to the difference between the back EMF VB and 0, where the adjustment degree may be larger under a larger difference, and vice versa.

Figure 4:
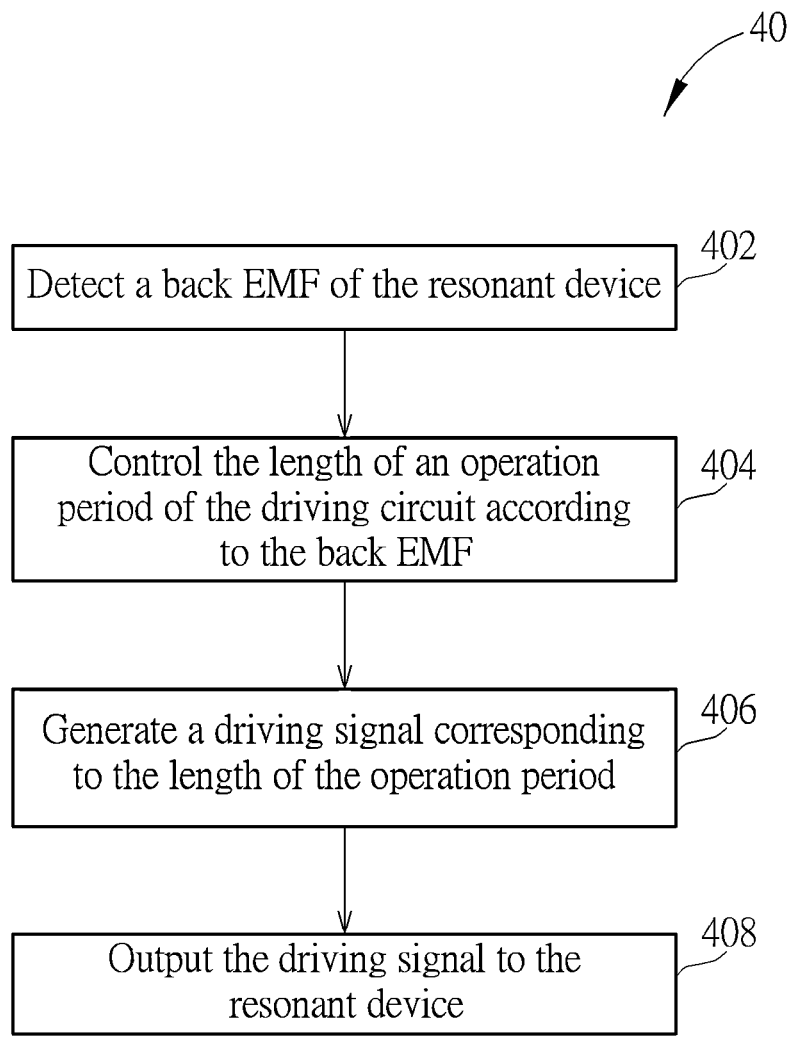
FIG. 4 is a flowchart of a driving process according to an embodiment of the present invention.

The abovementioned operations of driving the resonant device to detect its resonant frequency may be summarized into a driving process 40. The driving process 40 may be used for a driving circuit, such as the driving circuit 100 shown in FIG. 1, where the driving circuit may drive a resonant device to obtain the resonant frequency of the resonant device. As shown in FIG. 4, the driving process 40 includes the following steps:

Step 402: Detect a back EMF of the resonant device.

Step 404: Control the length of an operation period of the driving circuit according to the back EMF.

Step 406: Generate a driving signal corresponding to the length of the operation period.

Step 408: Output the driving signal to the resonant device.

In the driving process 40, Steps 402-408 may be continuously and repeatedly performed, so that the driving frequency corresponding to the operation period length of the driving circuit can gradually approach the resonant frequency of the resonant device. The detailed operations and alterations of the driving process 40 are described in the above paragraphs, and will not be narrated herein.

To sum up, the present invention provides a driving circuit, system and method for driving a resonant device (such as a LRA). The driving circuit may detect the back EMF of the resonant device, to adjust the operation period length of the driving circuit according to the value of the back EMF, so that the driving frequency of the driving circuit may gradually approach the resonant frequency of the resonant device. In such a situation, the driving circuit is able to drive the resonant device to operate at its resonant frequency, to achieve the optimal driving efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit for driving a resonant device, comprising:
    a voltage sensor, coupled to the resonant device, configured to detect a back electromotive force (EMF) of the resonant device;
    a signal controller, coupled to the voltage sensor, configured to control the length of an operation period of the driving circuit according to the back EMF;
    a signal generator, coupled to the signal controller, configured to generate a driving signal corresponding to the length of the operation period; and
    a driver, coupled to the signal generator, configured to output the driving signal to the resonant device.

2. The driving circuit of claim 1, wherein the signal controller is a frequency controller or a cycle controller, configured to control a driving frequency or a driving cycle of the driving circuit, to determine the length of the operation period according to the driving frequency or the driving cycle.

3. The driving circuit of claim 1, wherein the operation period comprises a driving period and a high-impedance period, wherein the driver outputs a pulse of the driving signal in the driving period and stops outputting the pulse in the high-impedance period.

4. The driving circuit of claim 3, wherein the high-impedance period comprises a first high-impedance period before the driving period and a second high-impedance period after the driving period, and the length of the first high-impedance period is substantially equal to the length of the second high-impedance period.

5. The driving circuit of claim 1, wherein the signal controller samples the back EMF at the end of the operation period to detect the back EMF.

6. The driving circuit of claim 1, wherein the driving signal is a positive signal in a first operation period, and the signal controller controls the length of a second operation period to be shorter than the length of the first operation period when the voltage sensor detects that the back EMF corresponding to the first operation period is smaller than 0, or the signal controller controls the length of the second operation period to be longer than the length of the first operation period when the voltage sensor detects that the back EMF corresponding to the first operation period is greater than 0.

7. The driving circuit of claim 1, wherein the driving signal is a negative signal in a first operation period, and the signal controller controls the length of a second operation period to be shorter than the length of the first operation period when the voltage sensor detects that the back EMF corresponding to the first operation period is greater than 0, or the signal controller controls the length of the second operation period to be longer than the length of the first operation period when the voltage sensor detects that the back EMF corresponding to the first operation period is smaller than 0.

8. A driving system, comprising:
a resonant device; and
a driving circuit, configured to drive the resonant device, the driving circuit comprising:
a voltage sensor, coupled to the resonant device, configured to detect a back electromotive force (EMF) of the resonant device;
a signal controller, coupled to the voltage sensor, configured to control the length of an operation period of the driving circuit according to the back EMF;
a signal generator, coupled to the signal controller, configured to generate a driving signal corresponding to the length of the operation period; and
a driver, coupled to the signal generator, configured to output the driving signal to the resonant device.

9. The driving system of claim 8, wherein the signal controller is a frequency controller or a cycle controller, configured to control a driving frequency or a driving cycle of the driving circuit, to determine the length of the operation period according to the driving frequency or the driving cycle.

10. The driving system of claim 8, wherein the operation period comprises a driving period and a high-impedance period, wherein the driver outputs a pulse of the driving signal in the driving period and stops outputting the pulse in the high-impedance period.

11. The driving system of claim 10, wherein the high-impedance period comprises a first high-impedance period before the driving period and a second high-impedance period after the driving period, and the length of the first high-impedance period is substantially equal to the length of the second high-impedance period.

12. The driving system of claim 8, wherein the signal controller samples the back EMF at the end of the operation period to detect the back EMF.

13. The driving system of claim 8, wherein the driving signal is a positive signal in a first operation period, and the signal controller controls the length of a second operation period to be shorter than the length of the first operation period when the voltage sensor detects that the back EMF corresponding to the first operation period is smaller than 0, or the signal controller controls the length of the second operation period to be longer than the length of the first operation period when the voltage sensor detects that the back EMF corresponding to the first operation period is greater than 0.

14. The driving system of claim 8, wherein the driving signal is a negative signal in a first operation period, and the signal controller controls the length of a second operation period to be shorter than the length of the first operation period when the voltage sensor detects that the back EMF corresponding to the first operation period is greater than 0, or the signal controller controls the length of the second operation period to be longer than the length of the first operation period when the voltage sensor detects that the back EMF corresponding to the first operation period is smaller than 0.

15. A driving method for a driving circuit to drive a resonant device, comprising:
detecting a back electromotive force (EMF) of the resonant device;
controlling the length of an operation period of the driving circuit according to the back EMF;
generating a driving signal corresponding to the length of the operation period; and
outputting the driving signal to the resonant device.

16. The driving method of claim 15, wherein the step of controlling the length of the operation period of the driving circuit according to the back EMF comprises:
controlling a driving frequency or a driving cycle of the driving circuit, to determine the length of the operation period according to the driving frequency or the driving cycle.

17. The driving method of claim 15, wherein the operation period comprises a driving period and a high-impedance period, wherein the driving circuit outputs a pulse of the driving signal in the driving period and stops outputting the pulse in the high-impedance period.

18. The driving method of claim 17, wherein the high-impedance period comprises a first high-impedance period before the driving period and a second high-impedance period after the driving period, and the length of the first high-impedance period is substantially equal to the length of the second high-impedance period.

19. The driving method of claim 15, wherein the driving signal is a positive signal in a first operation period, and the step of controlling the length of the operation period of the driving circuit according to the back EMF comprises:
controlling the length of a second operation period to be shorter than the length of the first operation period when detecting that the back EMF corresponding to the first operation period is smaller than 0; or
controlling the length of the second operation period to be longer than the length of the first operation period when detecting that the back EMF corresponding to the first operation period is greater than 0.

20. The driving method of claim 15, wherein the driving signal is a negative signal in a first operation period, and the step of controlling the length of the operation period of the driving circuit according to the back EMF comprises:
controlling the length of a second operation period to be shorter than the length of the first operation period when detecting that the back EMF corresponding to the first operation period is greater than 0; or
controlling the length of the second operation period to be longer than the length of the first operation period when detecting that the back EMF corresponding to the first operation period is smaller than 0.

* * * * *